June 9, 1959  K. W. KLEIN  2,890,300
TIME CONTROL SWITCH

Filed Nov. 14, 1955  2 Sheets-Sheet 1

Inventor:
Keith W. Klein
by Laurence R. Kempton
His Attorney.

June 9, 1959   K. W. KLEIN   2,890,300
TIME CONTROL SWITCH
Filed Nov. 14, 1955   2 Sheets-Sheet 2
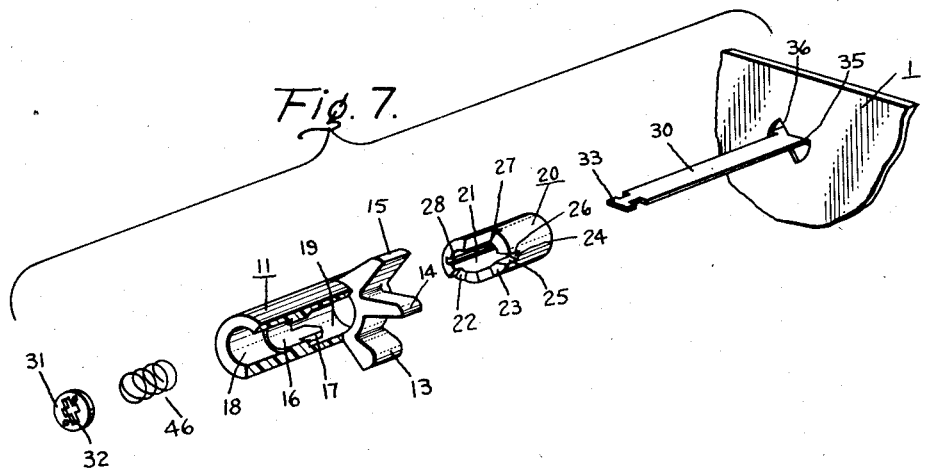
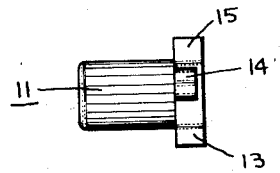
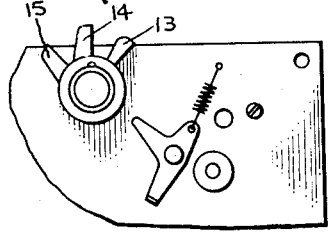
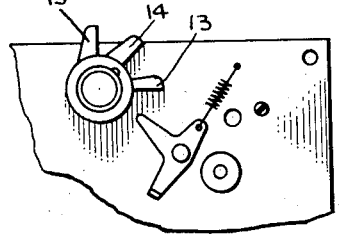
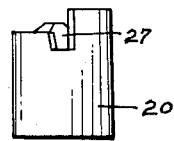
Inventor:
Keith W. Klein
by Lawrence R. Kempton
His Attorney

United States Patent Office 2,890,300
Patented June 9, 1959

2,890,300

TIME CONTROL SWITCH

Keith W. Klein, Hopkinton, Mass., assignor to General Electric Company, a corporation of New York Application November 14, 1955, Serial No. 546,728

6 Claims. (Cl. 200—38)

This invention relates to time controlled devices, and more particularly to switch means actuated as a function of time.

For example, it is found desirable to control apparatus such as an air conditioner so that it will be operated during the day and shut off at night. This is particularly true for air conditioning units used in office buildings and the like. In such an application, it is desirable to commence operation of the air conditioner shortly before arrival of the employees and to terminate its operation shortly after the usual closing time. While such a control system could be provided by the usual well-known time switch, the disadvantage arises on holidays and week-ends at which time operation of the air conditioner should be omitted.

Correspondingly, it is a primary object of this invention to provide a control device actuated periodically as a function of time and arranged to omit actuation during certain preselected periods. It is also an object of this invention to provide such a time control device with manually presettable means to select those periods during which operation is to be omitted.

Another object of this invention is to provide a time control switch which can be manually operated independently of the time control means and which can also be preset to omit one or more periods of operation.

In accordance with one aspect of this invention, a control lever rotating as a function of time cooperates with a rotatable set knob having a plurality of projecting arms. Thus, upon each rotation of the control lever, the set knob is rotatably advanced to the next position. A switch actuator is cooperatively associated with the set knob through a clutch which engages when the set knob is rotated to one position. Thereafter, set knob rotation rotates the switch actuator or equivalent control device. Depending upon the initial position of the set knob, one or more periods elapse before the clutch engages and the actuator is rotated.

In accordance with a further aspect of this invention, reset means becomes effective whenever the clutch is engaged. This reset means may comprise a second lever rotated as a function of time engageable with only one of the arms of the set knob.

Further objects and advantages of my invention as well as other modifications and uses thereof will become apparent as the description proceeds. My invention will be better understood by reference to the accompanying drawings in which:

Fig. 1 is a front elevation of an air conditioner time control switch, the set knob in its third position ready to be actuated by the "on" lever to turn the air conditioner unit on;

Fig. 7 is an exploded perspective view of the set knob and switch actuator;

Fig. 8 is a side elevational view of the set knob;

Fig. 9 is a partial front view of the switch mechanism showing the set knob in the manual "on" position;

Fig. 10 is a similar partial front view of the switch mechanism showing the set knob in the manual "off" position;

Fig. 11 is a side elevational view of the improved actuator cam.

Figure 2:
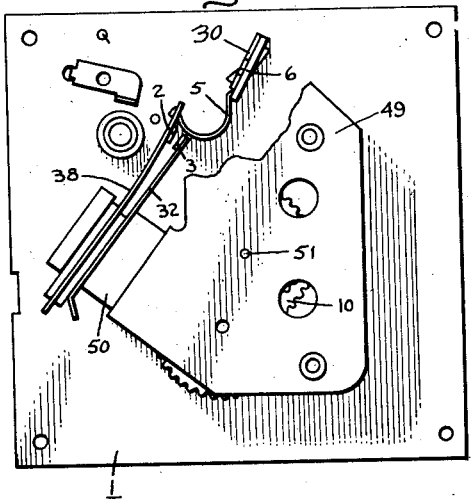
Fig. 2 is a rear elevation of the switch mechanism showing the switch in an "off" position.

As viewed in the drawings, a switch mechanism is attached to base plate 1 and includes switch contacts 2 and 3 shown in Fig. 2, to control a device such as an air conditioner unit. A time control system used to open and close switch contacts 2 and 3 will now be more particularly described.

A clock mechanism including speed reduction gears 10 is fastened by suitable means to the back side of plate 1. Shaft 51 is the output shaft of speed reduction gears 10 and extends through plate 1 to the front where it is connected to disk 7 by suitable connecting means. Adjustably mounted on the circumference of dial 7 for setting the time controlled periods are two levers 8 and 9 which are each preferably pivoted at one of their ends to shaft 51. An "on" pointer is preferably fixed to the other end of lever 8 for indicating the time when it is desired to have the controlled device turned on. Formed integral with lever 8 is a projection 12 for indexing a switch knob 11. "On" lever 8 is also provided with a pawl 46 for engagement with ratchet means (not shown) formed on the underside of disk 7 for adjustably fixing lever 8 to disk 7. In like manner, "off" lever 9 is provided with a pawl 47 (Fig. 3) for adjustably fixing lever 9 to the disk. Lever 9 is also provided with a projection 45 for contact with furcated lever 37 for a purpose to be more fully described hereinafter.

To indicate hours of the day, two sets of numerals ranging from 1 to 12 representing the hours of the day are inscribed on dial 7. If desired, a suitable cover plate (not shown) having a pointer in line with set knob 11 and shaft 51 may be used for pointing to the time of day indicated by rotatable dial 7.

Figure 1:
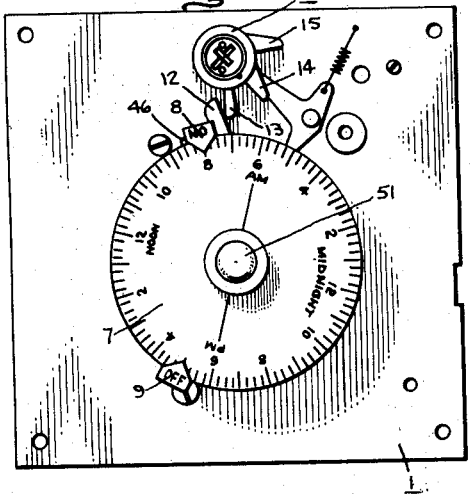

For operation of set knob 11, knob 11 is provided with three radially outwardly directed trip tabs 13, 14 and 15 respectively. As viewed in Fig. 8, tabs 13 and 15 are substantially flush with the bottom of set knob 11, but tab 14 may be spaced from the bottom of set knob 11 for a purpose to be more fully disclosed hereinafter. When trip tab 15 is in the position shown in Fig. 5, clockwise rotation of dial 7 causes projection 12 to index said tab 15 counterclockwise to the position shown in Fig. 6. Twenty-four hours later, projection 12 will again be in a position to index set knob 11 and will accordingly contact projection 14 as viewed in Fig. 6 and move said projection counterclockwise to the position shown in Fig. 1. Carrying this one step further, after an additional twenty-four hour period, projection 12, as shown in Fig. 1, completes another revolution clockwise thereby moving trip tab 13 counterclockwise to the position shown in Fig. 3.

As viewed in Fig. 7, it can be seen that set knob 11 is hollow and is provided with an enlarged bore 18 at one end thereof, an enlarged bore 19 at the other end thereof, with a centrally located annulus 16 separating bore 18 from bore 19. An axially extending cam follower 17 projects from annulus 16 within enlarged bore 19.

I provide means for selectively clutching set knob 11 to a switch actuator. In the arrangement illustrated, this means takes the form of actuator cam 20 shown in Fig. 7. Actuator cam 20 is a generally cylindrical member having an outside diameter which is slightly smaller than the internal diameter of enlarged bore 19 of set knob 11. Actuator cam 20 is internally bored as shown at 21. A plurality of axially arranged steps 22 and 23 are formed in the left portion of actuator cam 20, as viewed in Fig. 7. It is to be noted that a recess 24 is formed at the bottom of steps 22 and 23 between side walls 25 and 26. Thus, it can be seen that when set knob 11 is placed over actuator cam 20 with the end of cam follower 17 on step 22, set knob 11 may be rotated counterclockwise thereby causing cam follower 17 to move down from step 22 to step 23. Further rotation of switch knob 11 with respect to actuator cam 20 will cause cam follower 17 to move down into recess 24. In this position, cam follower 17 will be positioned in recess 24 and surrounded by walls 25 and 26 thereby effectively locking switch knob 11 to switch cam 20. Actuator cam 20 is further provided with a recess 27 displaced clockwise from recess 24 as viewed in Fig. 7. It can be seen that cam follower 17 and recess 27 form interengaging clutch members. If cam follower 17 is placed within recess 27, rotation of set knob 11 will cause corresponding rotation of cam 20. Actuator cam 20 is also provided with two diametrically opposed axially arranged grooves 28 for fixing said cam to actuator lever 30.

A switch actuator comprising the aforementioned actuator cam 20 and actuator lever 30 is provided for actuating a switch. Actuator lever 30 consists of a blade-like structure having a thin end, as viewed in Fig. 7, and a wide end 48, as viewed in Fig. 2. A hole 35 comprising two diametrically opposed segmental portions is formed in mounting plate 1 for reception of the thin end of actuator lever 30. The inside end of lever 30 being larger than hole 35 cannot pass therethrough and is pivoted between mounting plate 1 and a back plate 49. As viewed in Fig. 7, it can be seen that these holes allow limited rotational movement of switch actuator lever 30.

As viewed in Fig. 7, it is apparent that actuator cam 20, set knob 11 and switch actuator lever 30 may be assembled by sliding cam 20 over switch actuator lever 30 when aligned with grooves 28 and 29, until said cam abuts mounting plate 1. I provide means for resiliently biasing cam follower 17 axially toward switch cam 20. In the arrangement illustrated, this is accomplished by placing set knob 11 over actuator cam 20 so that the bottom surface of cam 20 bottoms on a shoulder formed on switch actuator lever 30. The bottom surface of set knob 11 is disposed closely adjacent to mounting plate 1. Then spring 46 is placed within enlarged bore 18 to rest upon annulus 16. A disk 31 including a keyway 32 is then placed within enlarged bore 18 and over the end of switch actuator 30 and cooperating key 33 formed on the switch actuator. The disk is rotated to lock the assembly in position.

Figure 4:
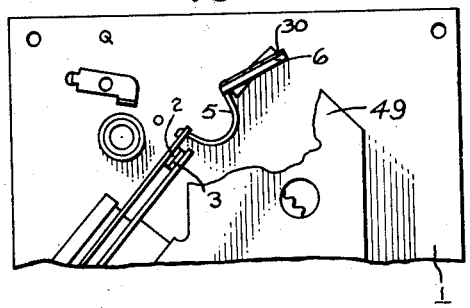
Fig. 4 is a partial rear elevation of the switch mechanism showing the switch in the "on" position.

As viewed in Fig. 2, the air conditioner switch includes a fixed switch blade 32 carrying switch contact 3 and a movable switch blade 38 for a switch contact 2. The switch blades are mounted on an insulator 50 in a manner well-known in the art. To provide for snap action, a U-shaped toggle spring 5 has one end thereof pivotally secured to an end of movable switch blade 38 and the other end thereof engaged with a dielectric plate 6, which in turn is rigidly fixed to switch actuator lever 30. As viewed in Fig. 2, when switch actuator 30 is rotated clockwise, the end of toggle spring 5 attached to dielectric plate 6 overcenters the end of toggle spring 5 attached to the switch blade 38 and the switch contacts snap to the closed position as shown by Fig. 4.

The mechanism for turning the switch to the "off" position will now be more particularly described. As viewed in Fig. 3, a furcated lever 37 is pivoted at 37a to mounting plate 1. This lever is provided with two diametrically opposed arms 39 and 40 respectively. Extending laterally from the intersection of these arms is a third arm 41 for engagement with trip tab 13 on set knob 11. Arm 41 cannot contact trip tab 14 since this tab is undercut to allow said tab to always pass over arm 41. When the rotational position of switch knob 11 is at the one-day delay position shown in Fig. 6, arm 41 cannot contact trip tab 15 since in this position, trip tab 15 is held above arm 41 because cam follower 17 is on step 23, as more fully described hereinbefore. A spring 42 is connected at one end thereof to mounting plate 1 and at the other end thereof to arm 40 to thereby bias furcated lever 37 to the position shown in Fig. 3. Arm 39 of furcated lever 37 is provided with an upwardly extending projection 44, as viewed in Fig. 3, for cooperation with downwardly extending projection 45 formed on the "off" lever. When disk 7 and "off" pointer 9, which is carried thereby, is rotated clockwise by the clock mechanism 10, downwardly projecting extension 45 of the "off" pointer will contact upwardly extending projection 44 of furcated lever 37 thereby causing counterclockwise rotation of furcated lever 37. This will cause arm 41 to move trip tab 13 to the left as viewed in Fig. 3 until it reaches the position shown in Fig. 1.

*Manual operation*

If manual operation is desired, set knob 11 is lifted against the compression of spring 46 and rotated as far as it will go in a counterclockwise direction. In this position, one side of cam follower 17 will abut a wall of recess 27. Then upon manual release of set knob 11 the force of spring 46 will move set knob 11 axially toward actuator cam 20 to position cam follower 17 within recess 27. Now, switch knob 11 is effectively clutched or locked to actuator cam 20. When set knob 11 is rotated, actuator cam 20 and switch actuator lever 30, which are locked thereto, will also rotate. As viewed in Fig. 2 when switch actuator lever 30 is moved counterclockwise, to the position shown in Fig. 2, switch contacts 2 and 3 snap to the open position. Opposite rotation closes the switch. During manual operation, trip tabs 13, 14 and 15 are displaced to either the manual open position shown in Fig. 9, or the manual closed position shown in Fig. 10 and therefore cannot be contacted by projection 12 or arm 41.

*Day to day operation*

If, for example, it is desired to have the air conditioner turned on every morning at eight o'clock and off at five in the afternoon, the "on" pointer and the "off" pointer are adjusted with respect to dial 7 as shown in Fig. 1, and set knob 11 is rotated to the position shown in Fig. 1. In this position, cam follower 17 is in recess 24 and locked between walls 25 and 26. Therefore, set knob 11, switch actuator cam 20, and switch actuator lever 30 are locked together. As viewed in Fig. 1, as 8:00 a.m. approaches, projection 12 on lever 8 moves clockwise to contact trip tab 13 and moves trip tab 13 counterclockwise to the position shown in Fig. 3. Since trip tab 13, set knob 11, switch actuator cam 20 and switch actuator lever 30 are locked together, switch actuator lever 30 also moves counterclockwise to the position shown in Fig. 3, or as viewed from the back in Fig. 4, switch actuator lever 30 moves clockwise causing contact 2 and 3 to snap to the closed position shown in Fig. 4 thereby to start the air conditioner unit. During the day, dial 7 moves clockwise, and at five o'clock, is in the position shown in Fig. 3. In this position, projection 45 on lever 9 will contact projection 44 on furcated lever 37 thereby moving arm 41 counterclockwise and trip tab 13 clockwise to the position shown in Fig. 1.

Figure 3:
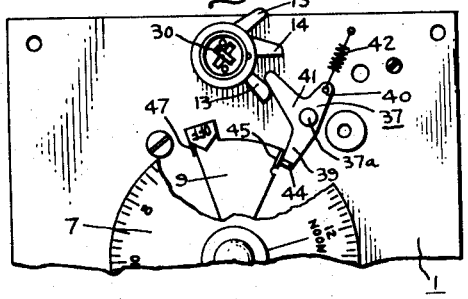
Fig. 3 is a partial front elevation showing the components in a different operative position just prior to switch actuation from "on" to "off"

Since clockwise motion, as viewed in Figs. 1 and 3, is the same as counterclockwise motion, as viewed in Figs. 2 and 4, switch actuator lever 30 will be moved counterclockwise from the position shown in Fig. 4 to the position shown in Fig. 2 thereby to overcenter toggle spring 5 and cause contacts 2 and 3 to snap open and turn the controlled device off. In this "off" position, trip tab 13 is in the position shown in Fig. 1 ready to be actuated by projection 12 at eight o'clock the next morning.

*Two-day delay operation*

Figure 5:
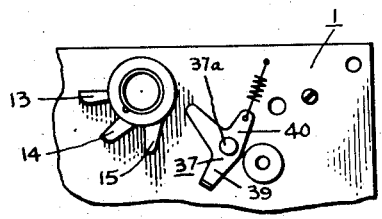
Fig. 5 is a partial front view of the switch mechanism showing the set knob in the two-day delay position.
Figure 6:
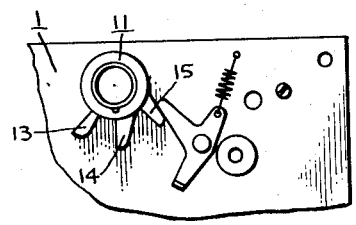
Fig. 6 is a front view of the switch mechanism showing the set knob in the one-day delay position.

If it is desired to have the air conditioner remain off for two successive days, for example Saturday and Sunday, and start Monday morning, switch knob 11 is rotated to the position shown in Fig. 5. In this position, cam follower 17 is placed on step 22 of switch actuator cam 20. In this position, switch knob 11 is not locked to switch cam 20. As disk 7 is rotated clockwise by the clock mechanism, projection 12 on lever 8 will contact trip tab 15 thereby rotating set knob 11 counterclockwise from the position shown in Fig. 5 to the position shown in Fig. 6. While switch knob 11 is thus indexed, cam follower 17 will be caused to move from step 22 to step 23 (Fig. 7); however, knob 11 is not clutched to the switch actuator and therefore, the switch is not actuated, but remains in an open position with the air conditioner shut off. With the particular setting shown by Fig. 1, at five o'clock Saturday evening, downward projection 45 on the "off" switch contacts upward projection 44 of furcated lever 37; however, since cam follower 17 is on step 23, trip tab 15 shown in Fig. 6 is displaced above arm 41 so that arm 41 may rotate freely beneath trip tab 15 without causing actuation of switch knob 11. The clock mechanism continues to rotate dial 7 when on Sunday morning at eight o'clock, projection 12 on lever 8 contacts trip tab 14 thereby rotating switch knob 11 counterclockwise from the position shown in Fig. 6 to the position shown in Fig. 1. This rotation causes cam follower 17 to slide on step 23 and drop down into recess 24. During this movement, cam follower 17 was not locked to the switch actuator cam 20 and therefore, the switch could not be actuated. At five o'clock Sunday afternoon, the downwardly extending projection 45 on lever 9 again contacts upwardly extending projecting projection 44 on furcated lever 37 thereby causing lever 37 to rotate counterclockwise. Since trip tab 14 is undercut, as shown in Fig. 8, arm 41 will merely slide under trip tab 14 without causing actuation of switch knob 11. On Monday morning at eight o'clock, projection 12 on lever 8 contacts trip tab 13 thereby rotating switch knob 11 counterclockwise. Since cam follower 17 is now in recess 24, switch actuator lever 30 is rotated counterclockwise as viewed in Fig. 7. Thus, switch actuator lever 30 will be rotated clockwise from the position shown in Fig. 2 to the position shown in Fig. 4, snapping switch contacts 2 and 3 to the closed position and starting operation of the controlled device.

*One-day delay operation*

One-day delay operation is essentially the same as two-day delay operation, the only difference being that switch knob 11 is initially positioned as shown in Fig. 6 rather than as shown in Fig. 5. In the position shown in Fig. 6, the cam follower 17 is placed on step 23. Hence, it will take one day rather than two days to move the cam follower into locking recess 24.

It is to be understood within the scope of this invention that various devices other than a switch may, of course, be actuated by the mechanism disclosed. For example, valves, variable condensers, variable resistances, solenoids and other such devices may be actuated by actuator 30. It is also to be understood that the timer control set forth above may be used to control devices other than air conditioner units. The timer could control heating units, fan units, the timed locking and unlocking of bank vaults, and many other devices.

While there has been shown and described a particular embodiment of this invention, it will be obvious to those skilled in the art that various other changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A control device comprising clock mechanism, a control lever designed to be continuously rotated in a fixed path by a clock mechanism, a set knob positioned in the path of said control lever adapted to be indexed from one position to a next succeeding position upon rotation of said control lever, a switch, switch actuator means arranged for cooperation with said set knob for actuating said switch, and clutch means including a cam follower on said set knob and a recess on said switch actuator for locking said set knob to said switch actuator thereby to cause actuation of said switch actuator when said control lever indexes said set knob.

2. A control device comprising first and second control levers rotated as a function of time, a rotatable set knob having a plurality of projecting arms adapted to be engaged by said first control lever upon rotation thereof, a switch, a switch actuator rotatable in one direction to close said switch and in an opposite direction to open said switch, clutch means interposed between said set knob and said switch actuator and engaged in one rotary position of said set knob to actuate said switch to closed position upon rotation of said set knob by said first control lever, said set knob when in other rotary positions being rotatable without rotation of said switch actuator, and a pivotally mounted reset lever having one arm engageable with only the arm of said set knob which is actuated to close said switch, said second control lever engaging said reset lever upon each revolution thereof, whereby said switch is actuated to open and closed positions as a function of time.

3. A control device comprising a control lever designed to be continuously rotated in a fixed path, a set knob positioned in the path of said control lever adapted to be indexed from one position to a next succeeding position every time the control lever makes one complete revolution, and actuator means including a cam having a plurality of steps, a first recess and a second recess circumferentially displaced from said first recess, said set knob including a cam follower biased toward the steps on said actuator means for sliding movement down said steps and into said first-mentioned recess to thereby lock said set knob to said actuator, whereby said actuator means is rotated by said lever when said set knob has been indexed sufficiently so that the cam follower is positioned within said first recess.

4. A switch comprising a control lever designed to be continuously rotated in a fixed path by a clock mechanism, a set knob positioned in the path of said control lever adapted to be indexed from one position to a next succeeding position every time the control lever makes one complete revolution, and actuator means arranged for cooperation with said set knob, said actuator including a recess, said set knob including a cam follower for manual insertion within the recess to thereby clutch said set knob to said actuator, a U-shaped toggle spring pivoted at one end to said actuator and pivoted at its other end to a movable switch blade, a contact on said movable switch blade, and a fixed switch blade spaced from said movable switch blade and having a contact thereon for cooperation with the contact on said movable switch blade.

5. A switch comprising a rotatable switch actuator including a cylindrical actuator cam fixed thereto for causing rotation thereof, said cam being provided with a plurality of axially arranged steps and a recess, a hollow rotatable set knob having a curved generally cylindrical inside surface positioned over and axially spring biased toward said cam, the inside surface of said set knob being provided with a radially inwardly projecting cam follower for selective engagement with a step or recess on said cam, a plurality of trip tabs attached to and extending radially outwardly from said set knob, and a continuously rotated dial spaced from said set knob, said dial having a projection thereon for selective engagement with said tabs thereby to cause rotation of said set knob.

6. A switch comprising a rotatable switch actuator having a cylindrical cam fixed thereto for causing rotation thereof, said cam being provided with a plurality of axially arranged steps and a recess, a hollow rotatable set knob having a curved generally cylindrical inside surface positioned over and axially spring biased toward said cam, the inside surface of said set knob being provided with a radially inwardly projecting cam follower for selective engagement with one of the steps or the recess on said cam, a plurality of trip tabs attached to and extending radially outwardly from said set knob, a continuously rotated dial spaced from said set knob, said dial having a first projection thereon, for selective engagement with said tabs, said dial having a second projection thereon, and a pivotal lever having its pivot point spaced from said set knob and said dial, said lever having an arm spaced in the path of the second projection on said dial, whereby when said cam follower is in selective engagement with the recess on said cam, rotation of said dial causes the second projection on said dial to rotate said lever, said lever rotates said set knob, and said set knob rotates said switch actuator.

References Cited in the file of this patent
UNITED STATES PATENTS

| | | |
|---|---|---|
| 2,146,562 | Cameron | Feb. 7, 1939 |
| 2,251,852 | Morgan | Aug. 5, 1941 |
| 2,488,110 | Aitken | Nov. 15, 1949 |
| 2,558,219 | Kohl | June 26, 1951 |
| 2,686,250 | Schroeder | Aug. 10, 1954 |
| 2,691,485 | Kennedy | Oct. 12, 1954 |